(12) United States Patent
Söderlund et al.

(10) Patent No.: US 9,622,028 B2
(45) Date of Patent: Apr. 11, 2017

(54) METHODS AND ARRANGEMENTS FOR HIGH ACCURACY POSITIONING

(75) Inventors: Tobias Söderlund, Solna (SE); Anna Bondesson, Stockholm (SE); Sebastian Elmgren, Djursholm (SE); Peter Håkansson, Lidingö (SE); Henning Jörgensen, Linköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 47 days.

(21) Appl. No.: 14/346,168

(22) PCT Filed: Sep. 26, 2011

(86) PCT No.: PCT/SE2011/051148
§ 371 (c)(1),
(2), (4) Date: Mar. 20, 2014

(87) PCT Pub. No.: WO2013/048295
PCT Pub. Date: Apr. 4, 2013

(65) Prior Publication Data
US 2014/0213291 A1    Jul. 31, 2014

(51) Int. Cl.
*H04W 24/00*     (2009.01)
*H04W 4/02*      (2009.01)
(Continued)

(52) U.S. Cl.
CPC ............. *H04W 4/02* (2013.01); *G01S 5/0009* (2013.01); *G01S 5/14* (2013.01); *H04W 64/003* (2013.01)

(58) Field of Classification Search
CPC ...... H04W 64/00; H04W 88/08; G08B 21/24; G08B 21/22; G06K 7/0008; G01S 5/0252; G01S 13/878; G01S 1/02
(Continued)

(56) References Cited

U.S. PATENT DOCUMENTS 6,014,109 A  * 1/2000 Raby ........................ 343/765
6,826,414 B1 * 11/2004 Reynolds et al. ........ 455/555
(Continued)

FOREIGN PATENT DOCUMENTS

EP       1 315 393        5/2003
WO    WO 2011/040856     4/2011

OTHER PUBLICATIONS

ABI Research Report "Alternative Positioning Technologies; A-GPS, Wi-Fi, Dead Reckoning, and Other Technologies" by Patrick Connolly and Dominique Bonte.
(Continued)

*Primary Examiner* — Charles Appiah
*Assistant Examiner* — Alexander Yi
(74) *Attorney, Agent, or Firm* — Patents on Demand P.A.; Brian K. Buchheit; Scott M. Garrett

(57) ABSTRACT

This disclosure relates to methods and arrangements for positioning of a communication device (102, 202, 208, 402, 502) in a communication system. Based on received radio channel information from a positioning server (112, 212, 408, 508), positioning nodes (104a-d, 204, 206, 410, 412, 510) identify (S-430, S-538, 704) a radio signal from said communication device, measure (S-432, S-433, S-540, 706) the strength of said received signal and sends (S-434, S-435, S-542, 708) signal strength information and position information of the positioning nodes to said positioning server. The positioning server then determines (S-436, S-544, 610) the position of the communication devices based on the received signal strength measurements and the position information of the positioning nodes. High accuracy in-door positioning of communication devices is achieved.

14 Claims, 6 Drawing Sheets

(51) Int. Cl.
*G01S 5/00* (2006.01)
*G01S 5/14* (2006.01)
*H04W 64/00* (2009.01)

(58) Field of Classification Search
USPC .............. 455/456.1, 524; 340/539.32, 572.1,
340/573.4; 342/451, 126, 146
See application file for complete search history.

(56) References Cited

U.S. PATENT DOCUMENTS

| | | | |
|---|---|---|---|
| 2002/0005804 A1* | 1/2002 | Suprunov | 342/457 |
| 2005/0266860 A1* | 12/2005 | Tamaki | G01S 5/0289 455/456.6 |
| 2006/0012476 A1* | 1/2006 | Markhovsky et al. | 340/539.32 |
| 2007/0060170 A1 | 3/2007 | Fukui | |
| 2009/0209268 A1* | 8/2009 | Ha | G01S 5/0289 455/456.1 |

OTHER PUBLICATIONS

International Search Report for International application No. PCT/SE2011/051148.
"LTE; Evolved Universal Terrestrial Radio Access Network (E-UTRAN); Stage 2 functional specification of User Equipment (UE) positioning in E-UTRAN (3GPP TS 36.305 version 10.2.0 Release 10)", Technical Specification, European Telecommunications Standards Institute (ETSI), 650, Route Des Lucioles; F-06921 Sophia-Antipolis; France, vol. 3GPP Ran 2, No. V10.2.0, (XP014066392).

* cited by examiner

METHODS AND ARRANGEMENTS FOR HIGH ACCURACY POSITIONING

PRIORITY

This nonprovisional application is a U.S. National Stage Filing under 35 U.S.C. §371 of International Patent Application Serial No. PCT/SE2011/051148, filed Sep. 26, 2011 and entitled "Methods and Arrangements far High Accuracy Positioning."

TECHNICAL FIELD

This disclosure pertains in general to the field of positioning, and more particularly to methods and arrangements for high accuracy positioning.

BACKGROUND

Global positioning system (GPS) technology or any other satellite-based position technology provide mobile devices, such as mobile phones, a method to determine the position thereof by triangulation. Assisted-GPS provides a faster positioning technology by a priori determining which satellites to listen to.

A disadvantage with satellite-based position technologies, is that they are not as such well suited for in-door or under-a-roof positioning applications, as multiple reflections make the received signals less reliable.

Uplink time difference of arrival (UTDOA) is an alternative technology that determines the position of a transmitter by measuring the difference in time of arrival of a signal transmitted by the transmitter in three or more receivers. The difference in time of arrival of the signal depends on the difference in distance between the transmitter and the different receivers. UTDOA depends on thermal stability of clocking oscillators, synchronization of the transmitter oscillator with the receiver oscillators, as well as phase synchronization of the transmitted signal with the received signal(s).

In a WIFI environment a mobile phone may use local WIFI routers to locate itself. This however requires information about where the WIFI routers themselves are placed.

In-building-solutions are specialized solutions to create capacity and coverage for mobile communication indoors by using a dedicated indoor network for mobile communication. These networks typically consist of a distributed antenna system where one large radio base station is connected to a network of small indoor antennas inside the building. Needless to say, this system requires installations of a distributed antenna system.

There is hence a need to provide positioning of communication devices either inside buildings, without the need to actively install software in or to configure said communication devices in any way, or to provide positioning outdoors in a facilitated manner. This is beneficial where satellite-based navigation is not possible due to low signal reliability or when GPS and/or WiFi are turned off to save battery.

There is also a demand for positioning arrangements that can be quickly set up and work even without working communication infrastructure to passively provide positioning of communication devices, such as mobile phones or vehicles with such means, in order to facilitate location of people in need in case of disasters or accidents.

SUMMARY

An object of the present disclosure is to address at least some of the issues outlined above, and provide positioning of a communication device within a communication system.

This is attained by measuring a signal strength at several positions of a signal transmitted by a communication device. Based on location information of said positions and on said measured signal strengths, the communication device is positioned.

According to one aspect of this disclosure, a method in a positioning server for positioning of a communication device, the positioning server being configured to communicate with a plurality of positioning nodes, is disclosed. The method comprises receiving radio channel information of said communication device, sending said received radio channel information of the communication device to said plurality of positioning nodes, receiving from one or more of said plurality of positioning nodes signal strength information of a signal transmitted by the communication device, where the signal strength information refers to the strength of said signal as received by each one of said one or more of said plurality of positioning nodes by using said radio channel information, obtaining information about one or more positions at which the signal was received of said one or more of said plurality of positioning nodes, and determining the position of the communication device based on the received signal strength information and the obtained positioning information of said one or more of said plurality of positioning nodes.

According to another aspect of this disclosure, a method in a positioning node for providing positioning information of a communication device to a positioning server in a positioning system, is disclosed. The method comprises obtaining radio channel information for the communication device from the positioning server, identifying a radio channel signal from the communication device, and measuring a signal strength of said identified said radio channel signal. The method in a positioning node further comprises sending information of said measured signal strength to the positioning server, enabling the positioning server to determine a position of the communication device.

According to yet another aspect of this disclosure, a positioning server for positioning of a communication device, is disclosed. The positioning server comprises a communication unit that is configured to receive radio channel information of said communication device, and to send said received radio channel information of the communication device to said plurality of positioning nodes. The communication unit is also configured to receive from one or more of said plurality of positioning nodes signal strength information of a signal transmitted by the communication device, where the signal strength information refers to the strength of said signal as received by each one of said one or more of said plurality of positioning nodes by using said radio channel information, and to obtain positioning information of said one or more of said plurality of positioning nodes. The positioning server also comprises a processor unit that is configured to determine the position of the communication device based on the received signal strength information and the obtained positioning information of said one or more of said plurality of positioning nodes.

According to still yet another aspect of this disclosure, a positioning node for providing positioning information of a communication device to a positioning server in a positioning system, is disclosed. The positioning node comprises a communication unit that is configured to receive radio channel information for the communication device from the positioning server, and a radio frequency unit that is configured to receive radio signals. The positioning node also comprises a processor that is configured to identify a radio signal from the communication device out of the received radio signals, and to measure a signal strength of said identified radio signal. The communication unit is further configured to send information of said measured signal strength to the positioning server, enabling the positioning server to determine a position of the communication device.

The present disclose come with a number of advantages, of which some are:

It is an advantage that a communication device may be positioned by using a single positioning node.

It is a further advantage that a communication device that is located in-doors may be located by using positioning nodes located in-doors and/or out-doors.

It is yet a further advantage that communication devices may be positioned anonymously.

Another advantage is that positioning along with the present disclosure generates a small amount of user-plane traffic, and a minimum of control-plane traffic.

Yet another advantage is that any communication device transmitting radio frequency signals may be positioned with high accuracy and in any environment including RF challenging indoor environments.

Also, positioning may be performed in any network; using frequency and time slot for global system for mobile communications networks, frequency and spreading code for code division multiple access and wideband code division multiple access networks and corresponding parameters for long term evolution networks.

Passive positioning nodes may be advantageous in available operator networks, since no traffic permission would be required.

A major advantage of this disclosure is that any communication device transmitting RF signals can be located without additional hardware or software for the end user, including low end mobile phones without support for satellite-based positioning systems. The present disclosure thus provides a positioning functionality without adding any requirements on communication devices to be positioned.

BRIEF DESCRIPTION OF DRAWINGS

These and other aspects, features and advantages of which this disclosure is capable of, will be apparent and elucidated from the following description of embodiments of this disclosure, reference being made to the accompanying drawings, in which FIGS. 1-3 schematically illustrate deployment of positioning nodes in positioning systems.

ABBREVIATIONS

GPS Global positioning system
RAN Radio access network
SAS Standalone SMLC
SMLC Serving mobile location centre
UE User equipment
UTDOA Uplink time difference of arrival

DETAILED DESCRIPTION

Based on collected location information by performed signal strength measurements at several positions, positioning of a communication device, transmitting said signal, is preferably performed.

Figure 1:
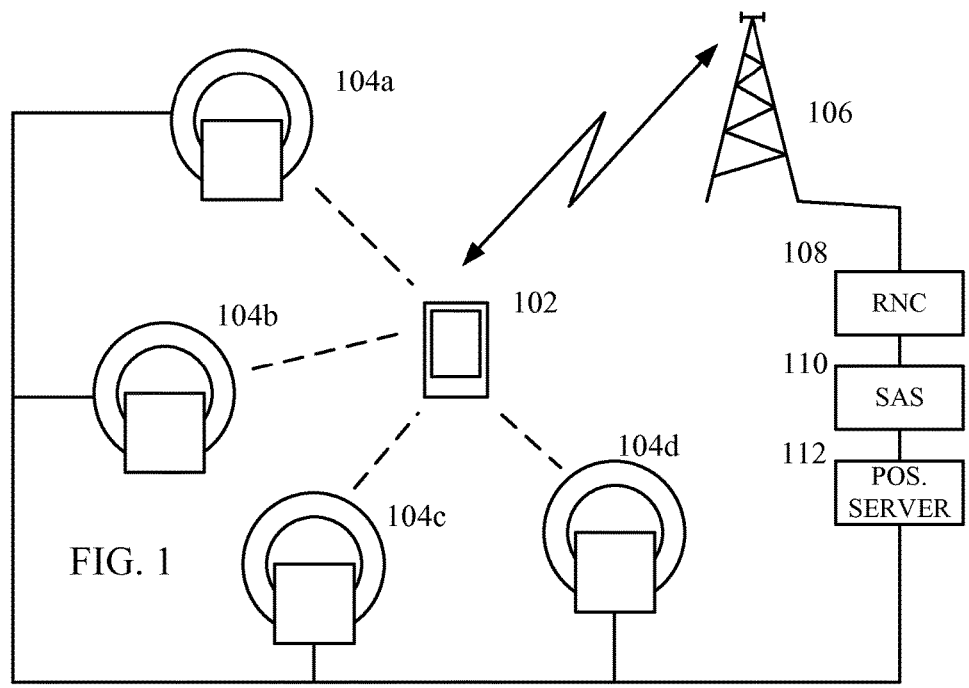

FIG. 1 schematically presents a positioning system related to one embodiment of the present disclosure. A communication device 102 to be positioned is ordered to transmit a signal to be received by position nodes 104a-104d. Based on radio characteristic information as received from a position server 112, each position node 104a-d recognizes the signal as transmitted by the communication device 102. Each position node 104a-d measures the signal strength of said received signal as transmitted by the communication device 102, and forwards the measured signal strength to the position server 112.

Together with the measured signal strength the position nodes may send a position node identifier, to enable the position server to identify from which position node the measured signal strength was sent.

The position nodes in FIG. 1 are typically positioned at a fixed location, and are hence static, according to one embodiment of this disclosure. The position server may have a predefined list of the position of each position node, with which the position server 112 recognizes each position node by using said position node identifier.

Any number of position nodes may be used for positioning of the communication device. It is evident that by using a larger number of position nodes, and therefore measured signal strengths, the positioning by the position server will be more accurate. For example, by using four distributed position nodes, the location of a communication device may be determined in the Euclidian X, Y, Z space dimensions.

It can be mentioned that the communication device 102 may be connected to any type of base station 106, such as a Node B, a radio base station or the like. In addition, the communication system may also comprise a standalone serving mobile location controller (SAS) connected to the positioning server 112.

Figure 2:
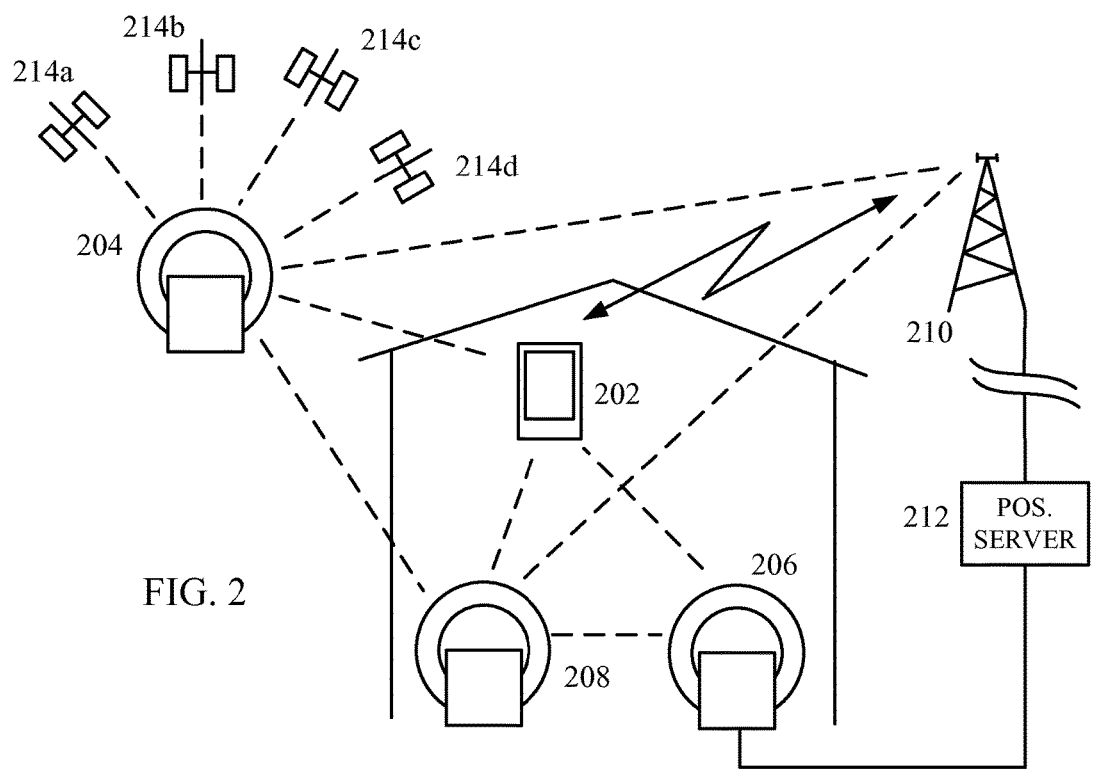

FIG. 2 schematically illustrates a deployment of positioning nodes in a positioning system.

Again a communication device 202 is to be positioned. As illustrated in FIG. 2 the communication device 202 is located in a house under a roof, for which reason satellite-based positioning system cannot be directly used for any communication devices or positioning nodes within the house.

However, a mobile positioning node 204 located outside the house may well use satellites 214a-214d for determining the position of itself.

Also, the positioning node 206 is a fixed position node with a position known, or at least available to the positioning server 212.

By using positioning nodes 204 and 206, the position of the communication device 202 may then be determined by the positioning server 212.

Likewise, by using the positioning nodes 204 and 206, the position of the communication device 208, being a mobile positioning node 208, may be determined by the positioning server 212.

By increasing the number of positioning nodes with known location, the determining of the position of the communication device 202 may become more accurate. The determination of the position of the communication device 202 may now be based on signal strength measurements made by positioning nodes 204, 206 and 208.

It should be mentioned that more positioning nodes, the positioning of which is initially unknown, may well be used for the positioning of a communication device. As briefly described above, in case the position of a positioning node is unknown when starting the positioning of a communication device, any positioning node may report a measured signal strength of the signal as transmitted by the communication device 202. The positioning server 212 preferably makes use of all measured signal strengths for the determination of the communication device, and may in this way achieve a high accuracy positioning of the communication device.

It may be added that positioning nodes 204 and 208 may well be mobile, whereas the positioning node 206 has a fixed location. A combination of moving and static positioning nodes is thus also accounted for.

As will be mentioned elsewhere also, in the case a positioning node with an unknown position is used to measure the signal as transmitted by the communication device, the position of said positioning node may also be determined by the positioning server.

It should be clarified that the present disclosure may also be utilized for the positioning of a positioning node. The positioning node with an unknown position may thus also be commanded to send a radio frequency signal to be identified by other positioning nodes. The strengths of this signal as received by said other positioning nodes are then typically measured by said other positioning nodes and sent to the positioning server for the determination of the position of the positioning node with a priori unknown position.

The present disclosure may thus be utilized for the positioning of positioning nodes as well as communication devices.

According to an alternative embodiment of the present disclosure, positioning of a communication device located indoors may well be performed by the using a singular positioning node. Since the positioning node measures a strength of a radio frequency signal as transmitted by the communication device, a high signal strength may well be translated into that the communication device is located within a short distance from the positioning node. This short distance may be estimated to be of the order of meters. It may thus be determined that the communication device is present in the vicinity of the positioning node.

The positioning of communication devices may be performed anonymously. However, the identity of a communication device may be determined by matching the frequency characteristics with information of a cooperative operator. This may also be another advantage of the present disclosure.

Figure 3:
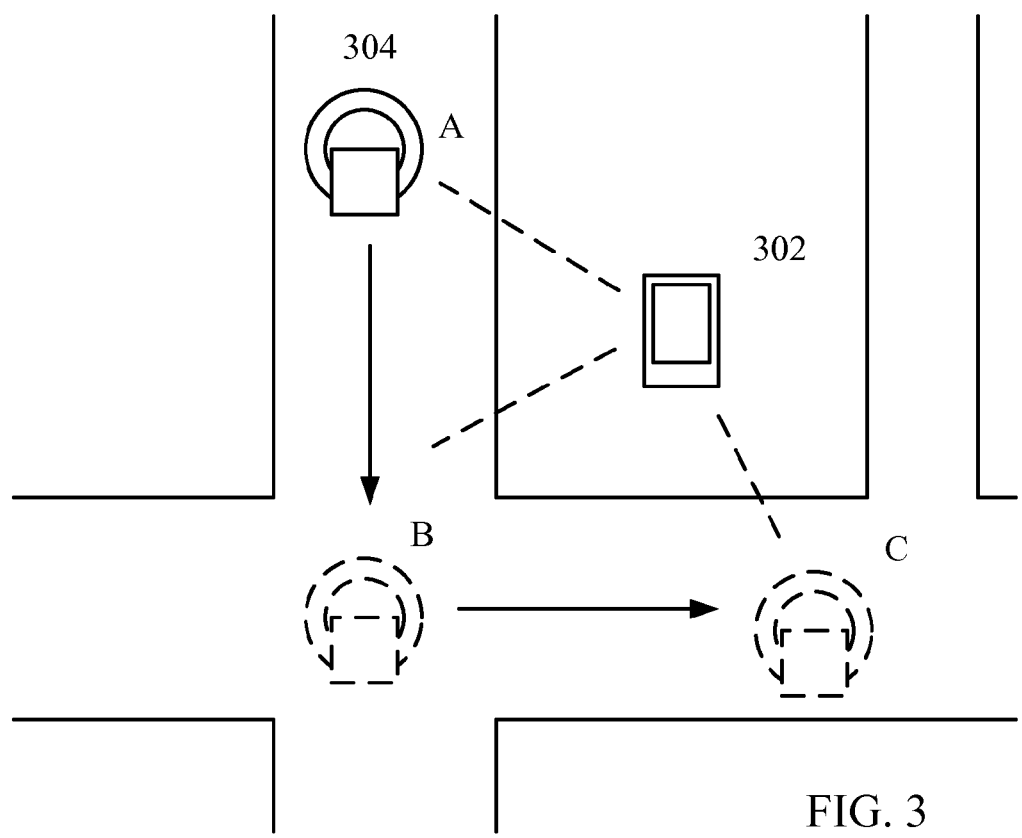

FIG. 3 schematically presents a deployment of a single positioning node at various positions, according to one embodiment of the present disclosure. Said positions may well be downtown in the street positions.

FIG. 3 also presents a communication device 302 located within a schematically presented block. It is emphasized that this FIG. 3 schematically illustrates an embodiment of the present disclosure in which a single positioning node 304 which at each instance in time only may be located at one single position. Since the positioning node 304 herein is moving it is at first located at a position A, then at a position B and thereafter at a position C.

The UE 302 may either by itself send a signal when requesting the position by itself, or receive a command from a base station to signal.

The UE 302 thus sends a signal that is first identified by the positioning node 304 at a first position, such as position A. Some time thereafter when the positioning node 304 is located at position B it again identifies a signal, and again after yet some more time it identifies a signal from a position C. After each identification of the signal, as transmitted from the communication device 302, the positioning nodes measures the received signal strength and sends said strength to a positioning server (not shown in FIG. 3). The positioning server will in this example thus receive three measured signal strengths in addition to position information of positions A, B and C of the positioning node 304, based on which it will determine the position of the communication device 302.

The position A, B, C of the positioning node 304 may be obtained from a satellite-based positions system such as global positioning system (GPS). With the use of a single positioning node 304 and signal strengths measured at several positions, the position of the communication device may thus be determined by the positioning server.

Figure 4:
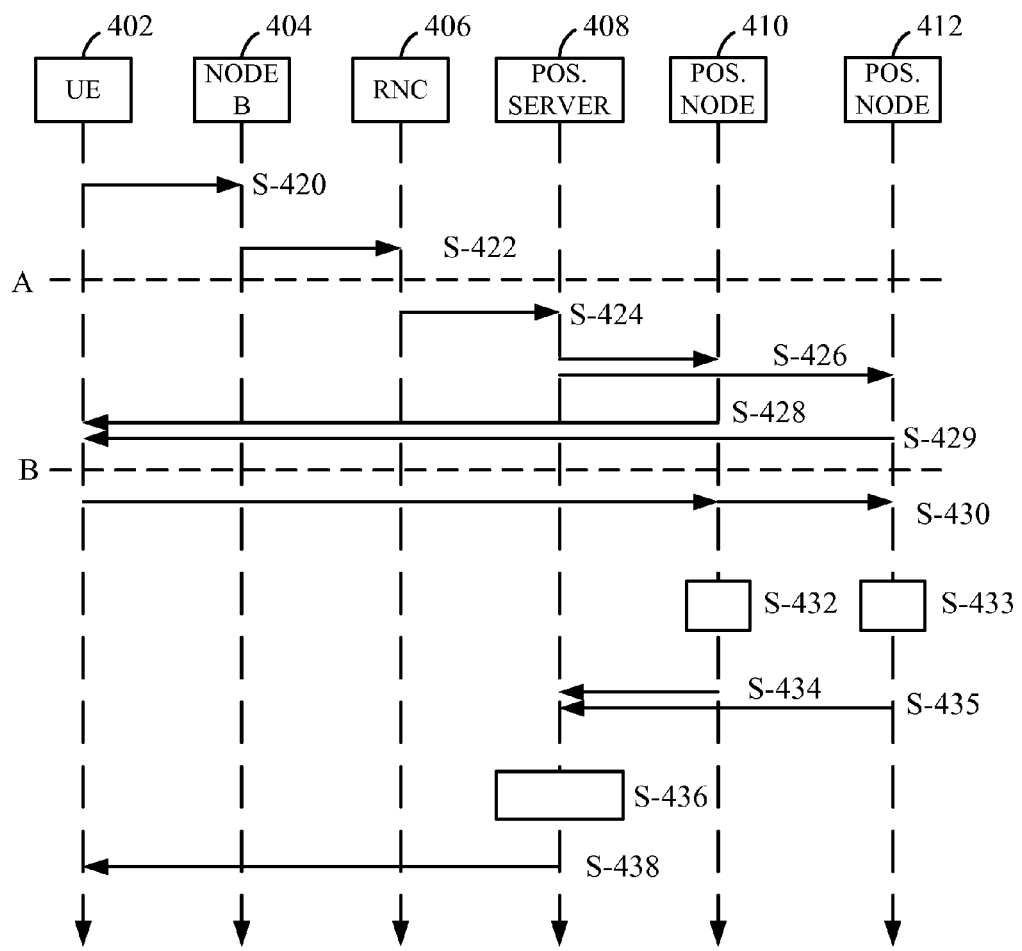
FIGS. 4 and 5 presents signaling type-diagrams related to embodiments of this disclosure.

FIG. 4 presents a signaling-type diagram of possible communication within a communication system, related to the present disclosure. In this example, a user equipment (UE) 402 sends a position request S-420 to a node B 404, by which the UE 402 requests it own position.

The node B 404 may then send this position request S-422 to a radio network controller (RNC) 406, to which the node B 402 is connected.

Based on information about in which cell the UE is located, the RNC 406 may then send radio channel characteristics information S-424 to a stand alone serving mobile location centre (SAS), which SAS then forwards this information to the positioning server 408.

Alternatively, a serving mobile location centre may be comprised in the RNC 406, for which reason the channel characteristics information may be sent directly from the RNC to the positioning server 408 in S-424.

In the case of global system for mobile communication (GSM) the radio channel characteristics information comprises frequency and timeslot information. In the case of wideband code division multiple access (WCDMA) the radio channel characteristics information comprises frequency and spreading code information for the positioning server 408.

The positioning server then sends said radio channel characteristics information S-426 to a plurality of positioning nodes 410, 412. For clarity only two are illustrated in FIG. 4. The positioning nodes 410, 412 may then each send an acknowledgement S-428, S-429 to the UE 402, acknowledging that the respective position node 410, 412 listens according to the received radio channel characteristics information. This acknowledgement is typically communicated over the air to the UE 402.

In FIG. 4 it is indicated an "A" and a "B" in the left-hand column. The paragraph defined within "A" and "B" may be performed for a number of positioning nodes, the number of which is based on the available number of positioning nodes near cell in which the UE 402 is located.

In S-430 each one of the positioning nodes 410, 412 receives a signal. By using the radio channel characteristics of the UE 402, each positioning node may identify a signal transmitted by said UE 402. In S-432 and S-433 the positioning node 410 and 412, respectively, measures the signal strength of said signal as received by the UE 402. In S-434 and S-435 the positioning node 410 and 412, respectively sends information about the signal strength to the positioning server 408.

In S-434 the positioning server may receive positioning information of the positioning node 410, where said positioning information comprise information about a fixed position of positioning node 410. This information may be an identifier of the positioning node 410, by which the positioning server 408 may identify the location of said positioning node 410.

In S-435 the positioning server may receive positioning information of the positioning node 412, where said positioning information comprises satellite-based position information of said positioning node 412.

In S-436 the positioning server 408 determines an X,Y, Z-position of the UE 402 based on the received signal strength information and based on the position information of the positioning nodes 410, 412.

In S-438 the position server 408 sends the determined position of the UE 402 to said UE 402. The UE 402 that was initially requesting its position, in S-420 has thus received its position.

Figure 5:
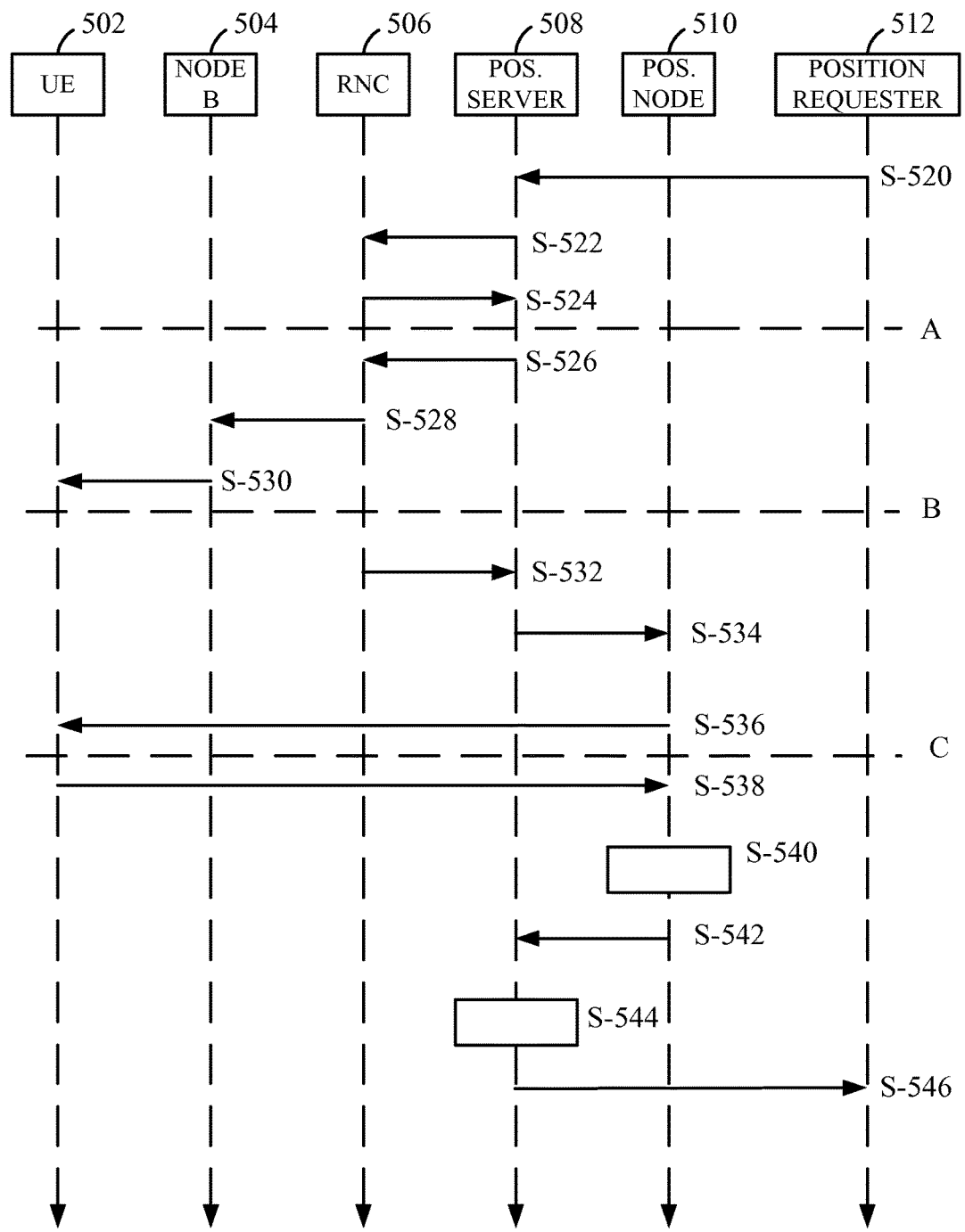

FIG. 5 presents a signaling-type diagram of possible communication within a communication system, related to the present disclosure.

It is noted that whereas the UE 402 itself was sending a position request S-420, it is within the signaling-type diagram of FIG. 5 a positioning requester 512 that requests the position of one or more UEs.

In FIG. 5 a position requester 512 sends a position request S-520 for the position of one or more UE 502 to the positioning server 510. A request for multi-positioning of user equipments (UEs) may be made for UEs within the same cell.

The positioning server 510 may then send a request for list of UEs within a cell to a SAS. The SAS then forwards the request S-522 for list of UEs within said cell to a radio network controller (RNC) 506. The RNC 506 determines which UEs are located within the cell and sends the list of UEs with said cell the SAS, after which said SAS forwards S-524 the list of UEs within the cell to said positioning server 508.

For each UE No. n within the cell, the positioning server 508 sends a request S-526 for positioning of UE No. n to the SAS, after which the SAS forwards the request for positioning of UE No. n to the RNC 506. The RNC 508 then sends a command to signal S-528 to node B 504. Thereafter the node B 504 sends the command to signal S-530 to the UE No. n 502.

In FIG. 5 it is indicated an "A" and a "B" in the left-hand column. The paragraph defined within "A" and "B" may be performed for each number n of UEs.

Based on the identity of each UE 502, the RNC 506 may then send radio channel characteristics information S-532 to a stand alone serving mobile location centre (SAS), which SAS then forwards this information to the positioning server 510. In the case of global system for mobile communication the radio channel characteristics information comprises frequency and timeslot information. In the case of wideband code division multiple access the radio channel characteristics information comprises frequency and spreading code information for the positioning server 508.

The positioning server 508 then sends said radio channel characteristics information S-534 to a plurality of positioning nodes, of which only one is illustrated in FIG. 5, namely positioning node 510. The positioning node 510 may then send an acknowledgement S-536 to the UE 502, acknowledging that the position node 510 listens according to the received radio channel characteristics information. This acknowledgement is typically communicated over the air to the UE 502.

In FIG. 5 it is indicated a "B" and a "C" in the left-hand column. The signaling steps within "B" and "C" may be performed for a number of positioning nodes, the number of which is based on the available number of positioning nodes near cell in which the UE 502 is located.

In S-538 the positioning node 510 receives a signal. Again, by using the received radio channel information of the UE 502, each positioning node may identify a signal transmitted by the UE 502, as the frequency characteristics of each UE is unique. In S-540 the positioning node 510 measures the signal strength of said signal as transmitted by the UE 502. In S-542 positioning node 510 may send information about the signal strength to the positioning server 508.

In S-542 the positioning server 508 may receive positioning information of the positioning node 510, where said positioning information comprise information about a fixed position of positioning node 510. This information may be an identifier of the positioning node 510, by which the positioning server 508 may identify the location of said positioning node 510.

Alternatively, in S-542 the positioning server 508 may receive positioning information of the positioning node 510, where said positioning information comprises satellite-based position information of said positioning node 510.

In S-545 the positioning server 508 can now determine an X,Y,Z-position of the UE 502 based on the received signal strength information and the position information of the positioning node 510 and others.

In S-546 the position server 508 sends the determined position of the UE 502 to the position requester 512.

According to an alternative embodiment of the present disclosure, the present disclosure may be used in a case when macro network is not working, due to a nature catastrophe or the like. If a communication device transmits a radio frequency signal a positioning node may opportunistically scan all possible frequencies and time-slots within a cell in an attempt to identify a transmitted signal. Needless to say, scanning may alternatively be performed for all possible frequencies and scrambling codes, or for other radio frequency characteristics. No excess communication is therefore needed for the positioning node to detect a radio frequency signal and to measure the strength of it. Having measured the signal strength, information about the signal strength is then sent to a positioning server for determination of the position of a communication device that transmitted the signal.

It may be clarified that the present disclosure is suitable for positioning of a large number of communication devices which may be operated by different operators and may use different radio frequency communication technologies. As long as the communication is based on communication of radio frequency signals, the present disclosure is well suitable for positioning of communication devices, such as mobile phones, etc.

Figure 6:
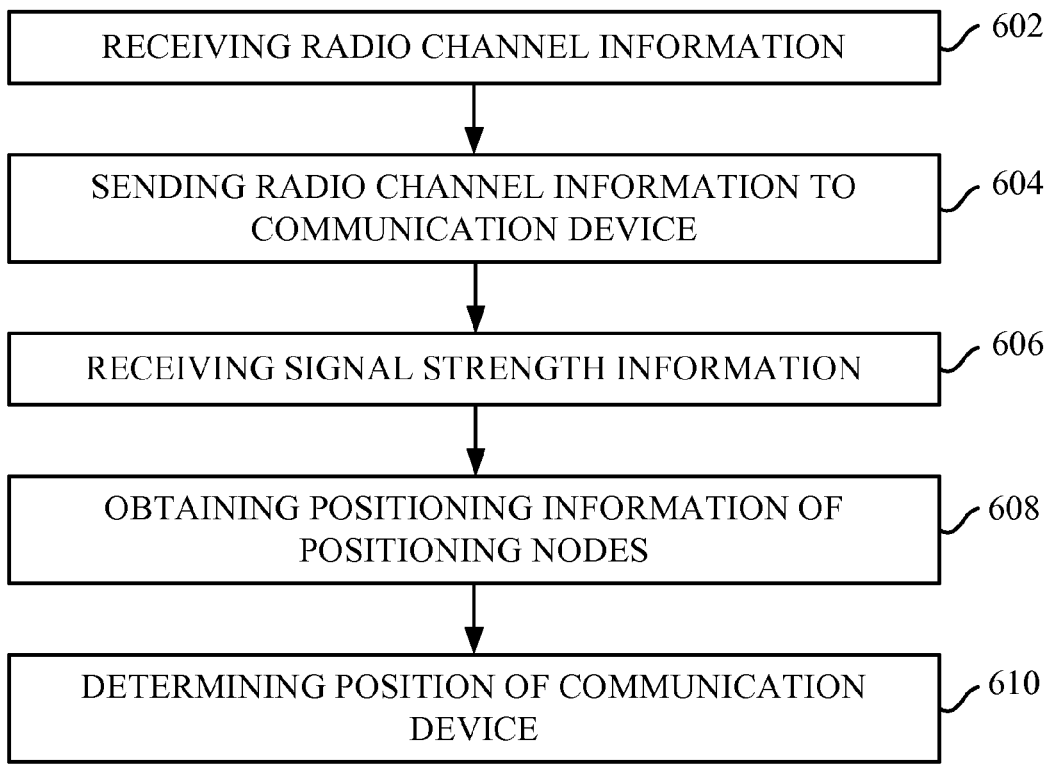
FIGS. 6 and 7 presents flow-charts of methods related to embodiments of this disclosure, and FIGS. 8 and 9 schematically illustrate arrangements according to some embodiments of this disclosure.

With reference to FIG. 6, a flowchart of a method in a positioning server for positioning of a communication device, is presented. Within the method the positioning server is configured to communicate with a plurality of positioning nodes.

The method comprises receiving 602 radio channel information of said communication device, and sending 604 said received radio channel information of the communication device to said plurality of positioning nodes. The method further comprises receiving 606 from one or more of said plurality of positioning nodes signal strength information of a signal transmitted by the communication device, where the signal strength information refers to the strength of said signal as received by each one of said one or more of said plurality of positioning nodes by using said radio channel information. The method also comprises obtaining 608 positioning information of said one or more of said plurality of positioning nodes, and determining 610 the position of the communication device based on the received signal strength information and the obtained positioning information of said one or more of said plurality of positioning nodes.

It is thus clear that a single positioning node may measure a radio frequency signal, transmitted by a communication device such as a UE, at various time instances and positions, according to one embodiment of the present disclosure The positioning information in the obtaining S-434, S-435, S-542, 608 positioning information of said one or more of said plurality of positioning nodes, may comprise information about a fixed position of said one or more of said plurality of positioning nodes. The one or more positioning nodes may thus be fixed in position according to one embodiment of the present disclosure.

Obtaining S-434, S-435, S-542, 608 positioning information of said one or more of said plurality of positioning nodes, may comprise receiving satellite-based position information of said one or more of said plurality of positioning nodes. Examples of satellite-based position information are global positioning system (GPS) information, global navigation satellite system information, Galileo positioning system information, etc.

According to one embodiment of the present disclosure, receiving S-434, S-435, S-542, 606 from one or more of said plurality of positioning nodes signal strength information, may comprise receiving S-434, S-435, S-542, 606 from one or more of said plurality of positioning nodes signal strength information of a signal transmitted by a certain positioning node of said plurality of positioning nodes. The determining here comprises determining the position of said certain positioning node of said plurality of positioning nodes based on the received signal strength information and the obtained positioning information of said one or more of said plurality of positioning nodes.

Positioning of a positioning node may herein also be performed based on other positioning nodes having known positions. By increasing the number of positioning nodes with unknown positions, which positioning nodes receive a signal transmitted by a communication device, such as a UE, the position of the communication device relative to the positioning nodes that measure a signal strength of a signal as transmitted by the communication device becomes more accurate.

In order to provide an accurate position of a positioning node in terms of translation and rotation in an X, Y, Z coordinate system, a reference position is needed. Coordinates of positioning node will hence also depend on the accuracy of the position of the positioning node(s).

Positioning scenarios may be sketched where positioning of members of a fire brigade is of uttermost importance. A reference position of a positioning node may be a fire engine or any other fixed or semi-fixed position. Of importance is thus the position of each fireman, being either outside or inside a building. As each fireman well may wear a positioning node, a positioning server may determine the position of each positioning node relative to the fire engine, as thereby determine whether the entire crew has managed to exit the building.

In a alternative embodiment a positioning node may be positioned near a commercial screen and simply by a request for multi-positioning all communication devices within a cell, the number of communication devices present in front of the commercial screen may be determined. A positioning server will thus receive information about signal strengths as measured by said positioning node. Based on the signal strength it is decided whether a communication device is near or far away from said commercial screen.

In local environments the position of a communication device to be positioned may thus become highly accurate.

The present disclosure is also versatile in respect to the communication system being used by the communication device. Radio channel information in the receiving radio channel information and the sending radio channel information, may hence comprise radio characteristics of global system for mobile communications, wideband code-division multiple access or long-term evolution.

Figure 7:
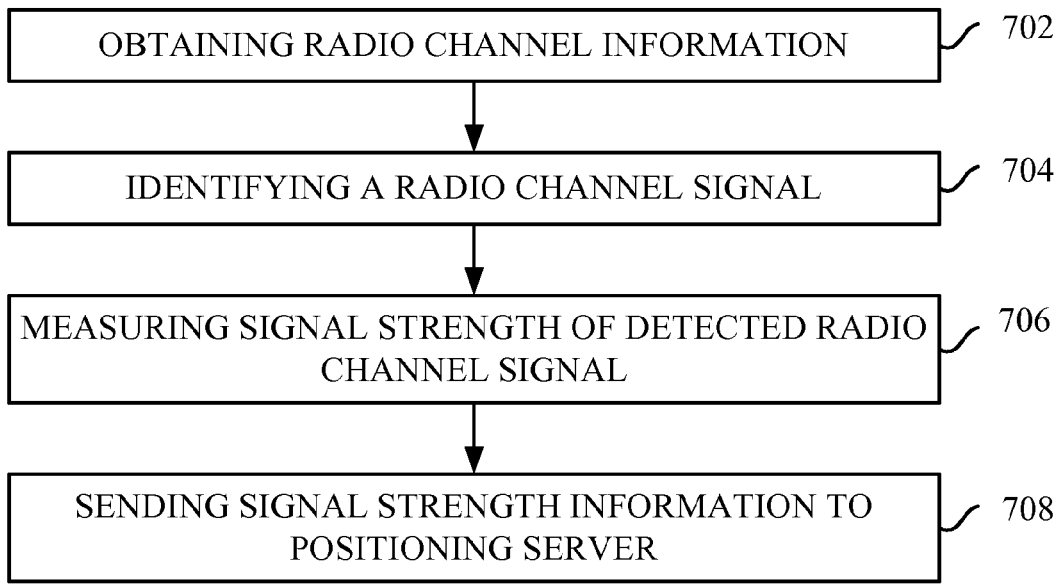

With reference to FIG. 7, a flowchart of a method in a positioning node for providing positioning information of a communication device 102, 202, 208, 402, 502 to a positioning server 112, 212, 408, 508 in a positioning system, is presented. The method comprises obtaining 702 radio channel information for the communication device from the positioning server, identifying 704 a radio channel signal from the communication device, and measuring 706 a signal strength of said identified radio channel signal. The method also comprises sending 708 information of said measured signal strength to the positioning server, enabling the positioning server to determine a position of the communication device.

The positions node may also send information to the positioning server about a satellite-based position, or a fixed position, of the positioning node. The position of the positioning node may alternatively have been determined by using any other technique, such as relative distance position determination by using explicit distance measurements by using laser light measurement, to mention one example only.

Figure 8:
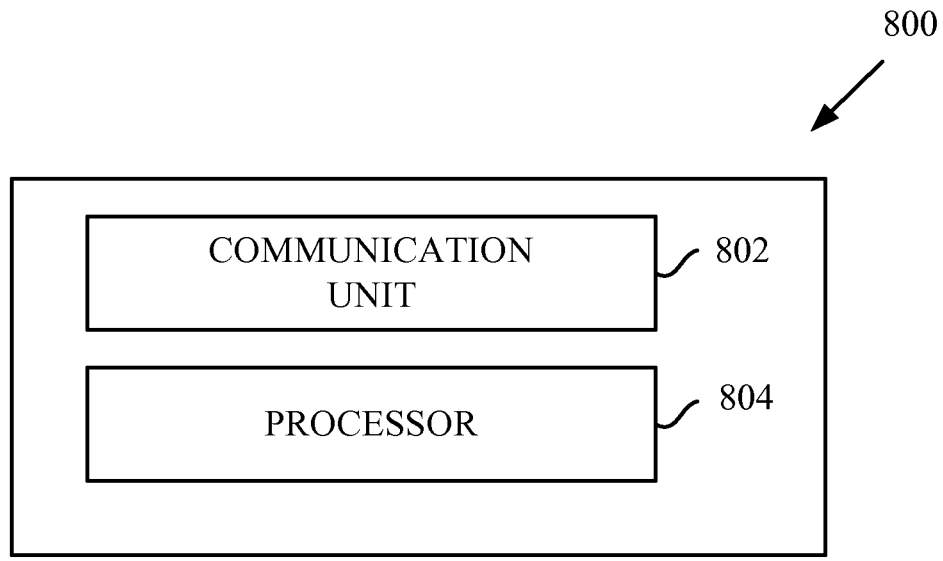

FIG. 8 schematically illustrates a positioning server 800 for positioning of a communication device 102, 202, 208, 402, 502. The positioning server comprises a communication unit 802 that is configured to receive radio channel information of said communication device, and to send said received radio channel information of the communication device to said plurality of positioning nodes. The communication unit is also configured to receive from one or more of said plurality of positioning nodes signal strength information of a signal transmitted by the communication device, where the signal strength information refers to the strength of said signal as received by each one of said one or more of said plurality of positioning nodes by using said radio channel information, and to obtain positioning information of said one or more of said plurality of positioning nodes. In addition, the positioning node comprises a processor 804 that is configured to determine the position of the communication device based on the received signal strength information and the obtained positioning information of said one or more of said plurality of positioning nodes. The positioning server may in addition also comprise a memory unit, in which determined positions of communication device are stored. Alternatively, said information may be cached to another memory elsewhere. Knowing where in a department store or in a tunnel person A and B were at a time when a fire started, and the electricity was lost, may be much appreciated and very valuable piece of information.

Figure 9:
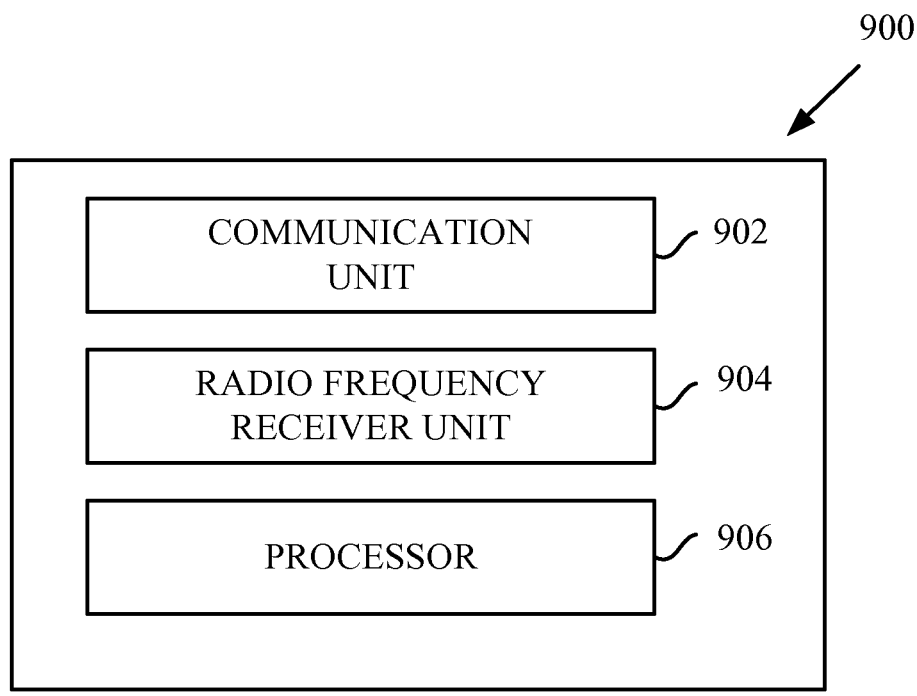

In FIG. 9 a positioning node 900 for providing positioning information of a communication device 102, 202, 208, 402, 502 to a positioning server 800 in a positioning system, is schematically presented. The positioning node comprises a communication unit 902 that is configured to receive radio channel information for the communication device from the positioning server 800. The positioning node further comprises a radio frequency receiver 904 that is configured to receive radio signals. The positioning node also comprises a processor 906 that is configured to identify a radio channel signal from the communication device based on the obtained radio channel information, and to measure a signal strength of said identified radio channel signal. In addition, the communication module 902 is configured to send information of said measured signal strength to the positioning server, enabling the positioning server to determine a position of the communication device.

The processor 906 may also be configured to set the radio frequency receiver 904 to the right frequency according to the receiving radio channel information.

It should be mentioned that the communication device may be a UE such as a mobile phone, as mentioned above. Alternatively, the communication device may be a positioning node, the position of which is unknown or obsolete or for any other reasons outdated.

It is added that the present disclosure also comprises a method in a positioning system for providing a position of a communication device 102, 202, 208, 402, 502, wherein the method comprises the method for positioning of a communication device according to any one of appended claims 1-5, and the method for providing positioning information of a communication device according to appended claim 6 or 7.

The present disclosure may be utilized in a large number of applications. Applications of this disclosure include positioning of missing persons carrying a communication device, vehicles in tunnels or involved in accidents, lost mobile devices or persons trapped in a fire or other emergency situations, logistic tools within hospital environments and for surveillance services.

In a nature catastrophe situation the location of people in need can be mapped, messages may be send providing information such as "we know where you are and will send someone in to rescue you", or a two way communication link can be established between people in need and rescuers. Messages from authorities or non governmental organizations (NGOs) such as "If you have any skills within health care please register as a volunteer at the local post office . . . " can also be delivered to the whole society or to people located in a specific area.

Deployments of positioning nodes each at a fixed position, may be used for applications such as advertisements, road tolls, controlling heating, ventilation and air conditioning based on the presence of people and other location/presence-based services.

Deployment of positioning nodes mounted on vehicles or carried by people or animals may be used for applications such as locating people in emergency areas such as fires or earth-quake areas.

It must be emphasized that this disclosure may be varied in many ways. The elements of an embodiment of this disclosure may be physically, functionally and logically implemented in any suitable way. Indeed, the functionality may be implemented in a single unit, in a plurality of units or as part of other functional units. As such, this disclosure may be implemented in a single unit, or may be physically and functionally distributed between different units and processors.

It is made clear that presented embodiments may well be combined forming new embodiments not explicitly described herein.

The present disclose come with a number of advantages, of which some are explicitly mentioned below.

It is an advantage that a communication device may be positioned by using a single positioning node.

It is a further advantage that a communication device that is located in-doors may be located by using positioning nodes located in-doors and/or out-doors.

It is yet a further advantage that communication devices may be positioned anonymously.

Another advantage is that positioning along with the present disclosure generates a small amount of user-plane traffic, and a minimum of control-plane traffic.

Yet another advantage is that any communication device transmitting radio frequency signals may be positioned with high accuracy and in any environment including RF challenging indoor environments.

Also, positioning may be performed in any network; using frequency and time slot for GSM networks, frequency and spreading code for CDMA and WCDMA networks and corresponding parameters for long term evolution networks.

Passive positioning nodes may be advantageous in available operator networks, since no traffic permission would be required.

A major advantage of this disclosure is that any communication device transmitting RF signals can be located without additional hardware or software for the end user, including low end mobile phones without support for satellite-based positioning systems. The present disclosure thus provides a positioning functionality without adding any requirements on communication devices to be positioned.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although this disclosure has been described above with reference to specific embodiment, it is not intended to be limited to the specific form set forth herein. Rather, this disclosure is limited only by the accompanying claims and, other embodiments than the specific above are equally possible within the scope of these appended claims.

The invention claimed is:

1. A method in a positioning server for positioning of a communication device, said positioning server being configured to communicate with a plurality of positioning nodes, said method comprising:
   receiving radio channel characteristics information of said communication device comprising frequency information,
   sending said received radio channel characteristics information of said communication device to said plurality of positioning nodes,
   receiving from one or more of said plurality of positioning nodes, signal strength information indicating strength of a signal received by said plurality of positioning nodes from said communication device by using said radio channel characteristics information being sent by said positioning server,
   receiving positioning information about one or more positions, at which said signal was received, of said one or more of said plurality of positioning nodes along with said signal strength information from said one or more of said plurality of positioning nodes,
   wherein at least one of the one or more of said plurality of positioning nodes is a mobile positioning node; and determining a position of said communication device based on said received signal strength information and said received positioning information of said one or more of said plurality of positioning nodes, wherein any number of positioning nodes and any proportion of mobile positioning nodes to static positioning nodes may be used to determine the position of said communication device.

2. The method according to claim 1, wherein positioning information in the receiving positioning information of said one or more of said plurality of positioning nodes, comprises information about a fixed position at which said signal was received of said one or more of said plurality of positioning nodes.

3. The method according to claim 1, wherein receiving positioning information of said one or more of said plurality of positioning nodes, comprises receiving satellite-based position information of positions at which said signal was received of said one or more of said plurality of positioning nodes.

4. The method according to claim 1, wherein said receiving from one or more of said plurality of positioning nodes signal strength information, comprises receiving from one or more of said plurality of positioning nodes signal strength information of a signal transmitted by a certain positioning node of said plurality of positioning nodes.

5. The method according to claim 1, wherein said radio channel information in said receiving radio channel information and said sending radio channel information, comprises radio characteristics of global system for mobile communications, wideband code-division multiple access or long-term evolution.

6. A method in a mobile positioning node for providing positioning information of a communication device to a positioning server in a positioning system, the method comprising:

obtaining radio channel characteristics information comprising frequency information for said communication device from said positioning server, identifying a radio channel signal from said communication device, and measuring a signal strength of said identified said radio channel signal by using said radio channel characteristics information being obtained from said positioning server, wherein said signal strength is based in part on a location of said mobile positioning node, and wherein information of said measured signal strength is sent to said positioning server, and sending positioning information about a position at which said radio channel signal was identified by said mobile positioning node, along with said information of said measured signal strength to said positioning server, enabling said positioning server to determine a position of said communication device, wherein any number of positioning nodes and any proportion of mobile positioning nodes to static positioning nodes may be used to determine the position of said communication device.

7. The method in a mobile positioning node according to claim 6, further comprising obtaining information about a satellite-based position of said mobile positioning node and sending said information to said positioning server about the satellite-based position, at which the signal was received by said mobile positioning node, of said mobile positioning node.

8. The mobile positioning node according to claim 6, further comprising obtaining information about a fixed position at which said signal was received by said mobile positioning node and sending said information about said fixed position to said positioning server.

9. The mobile positioning node according to claim 6, further comprising obtaining position information from user input about a position at which said signal was received by said mobile positioning node and sending said information about said position to said positioning server.

10. A positioning server for positioning of a communication device, said positioning server comprising: a communication unit configured to:

receive radio channel characteristics information comprising frequency information of said communication device, send said received radio channel characteristics information of said communication device to a plurality of positioning nodes, receive from one or more of said plurality of positioning nodes, signal strength information indicating strength of a signal received by said plurality of positioning nodes from said communication device by using said radio channel characteristics information being sent by said positioning server, and receive positioning information, about one or more positions at which said signal was received, of said one or more of said plurality of positioning nodes along with said signal strength information of said signal, from said one or more of said plurality of positioning nodes, wherein at least one of the one or more of said plurality of positioning nodes is a mobile positioning node, and a processor unit configured to determine a position of said communication device based on said received signal strength information and said received positioning information of said one or more of said plurality of positioning nodes, wherein any number of positioning nodes and any proportion of mobile positioning nodes to static positioning nodes may be used to determine the position of said communication device.

11. A mobile positioning node for providing positioning information of a communication device to a positioning server in a positioning system, said mobile positioning node comprising:

a communication unit configured to receive radio channel characteristics information comprising frequency information for said communication device from said positioning server, and a radio frequency unit configured to receive radio signals, and a processor that is configured to: identify a radio signal from said communication device out of said received radio signals, and measure a signal strength of said identified radio signal by using said radio channel characteristics information being received from said positioning server, wherein said signal strength is based in part on a location of said mobile positioning node and wherein information of said measured signal strength is sent to said positioning server; and wherein the communication unit further is configured to send positioning information about a position at which said radio signal was identified by said mobile positioning node, along with said information of said measured signal strength to said positioning server, enabling said positioning server to determine a position of said communication device, wherein any number of positioning nodes and any proportion of mobile positioning nodes to static positioning nodes may be used to determine the position of said communication device.

12. The mobile positioning node for providing positioning according to claim 11, wherein said communication device is either a portable communication device or a position node.

13. The method in a mobile positioning node according to claim 6, wherein said signal strength is a first signal strength and said location of said mobile positioning node is a first location, said method further comprising:
- moving from said first location to a second location;
- identifying said radio channel signal from said communication device;
- measuring a second signal strength of said identified said radio channel signal; and
- sending information of said second measured signal strength to said positioning server, enabling said positioning server to determine a position of said communication device.

14. The mobile positioning node according to claim 11, wherein said signal strength is a first signal strength and said location of said mobile positioning node is a first location, said mobile positioning node further comprising:

the processor further configured to identify said radio channel signal from said communication device, and measure a second signal strength of said identified said radio channel signal, wherein said second signal strength is based in part on a second location of said mobile positioning node; and said communication unit is further configured to send information of said second measured signal strength to said positioning server, enabling said positioning server to determine a position of said communication device.

* * * * *